(12) United States Patent
Sasaki et al.

(10) Patent No.: US 7,230,895 B2
(45) Date of Patent: Jun. 12, 2007

(54) INFORMATION RECORDING APPARATUS AND INFORMATION RECORDING METHOD

(75) Inventors: Yoshio Sasaki, Tokorozawa (JP); Hiroyuki Uchino, Tokorozawa (JP); Yasuhiko Tominaga, Tokorozawa (JP); Hidenori Nakagawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 100 days.

(21) Appl. No.: 10/545,791

(22) PCT Filed: Feb. 16, 2004

(86) PCT No.: PCT/JP2004/001639
§ 371 (c)(1),
(2), (4) Date: Aug. 17, 2005

(87) PCT Pub. No.: WO2004/077418
PCT Pub. Date: Sep. 10, 2004

(65) Prior Publication Data
US 2006/0156322 A1    Jul. 13, 2006

(30) Foreign Application Priority Data
Feb. 25, 2003    (JP) ................. 2003-047164

(51) Int. Cl.
*G11B 5/09* (2006.01)
(52) U.S. Cl. .............. 369/47.53; 369/47.5; 369/59.1; 369/53.1

(58) Field of Classification Search ............ None
See application file for complete search history.

(56) References Cited

U.S. PATENT DOCUMENTS 5,640,381 A * 6/1997 Call et al. ............... 369/47.52
6,950,377 B2 * 9/2005 Matsuura et al. .......... 369/47.5
7,050,367 B1 * 5/2006 Negishi et al. ............ 369/47.1

FOREIGN PATENT DOCUMENTS

| JP | 7-73496 | 3/1995 |
| JP | 9-16964 | 1/1997 |
| JP | 9-293259 | 11/1997 |
| JP | 2003-85753 | 3/2003 |

* cited by examiner

Primary Examiner—Muhammad Edun
(74) Attorney, Agent, or Firm—Young & Thompson

(57) ABSTRACT

A laser beam from a pickup is focused on an information recording medium, such as a DVD-R/RW, to record information. When the power of the laser beam is calibrated, the laser beam emitted from the pickup is received by a light receiving unit such as an FMD. The level of the received laser beam is detected, the power ratio of the laser beam is determined based on the result, and the power of the laser beam is calibrated so that the power ratio matches a predetermined reference power ratio. This method enables information to be recorded with optimum recording characteristic because the reference power ratio shows the power ratio for recording information at the optimum characteristics.

10 Claims, 11 Drawing Sheets

DISTORTION RATIO = B/A*100 (%)

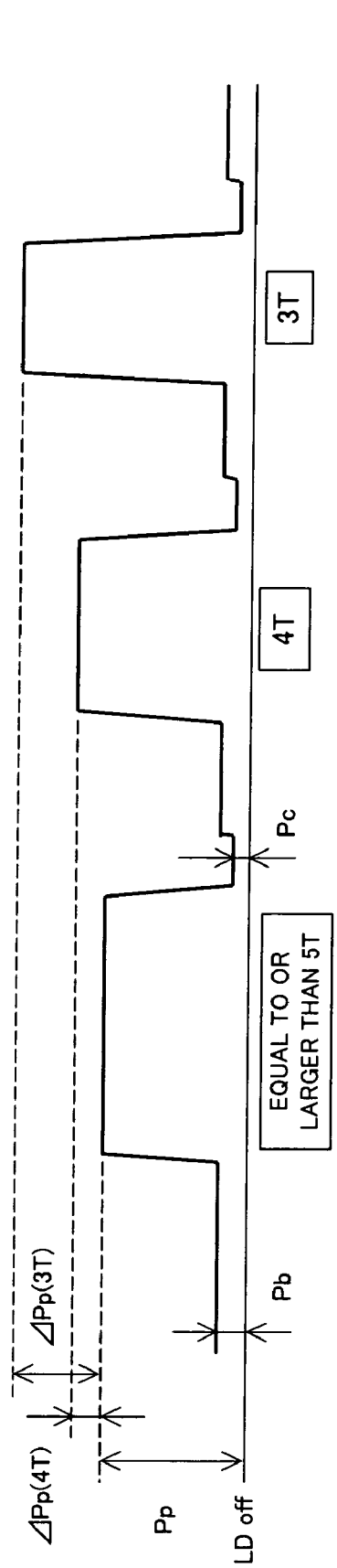
FIG. 11
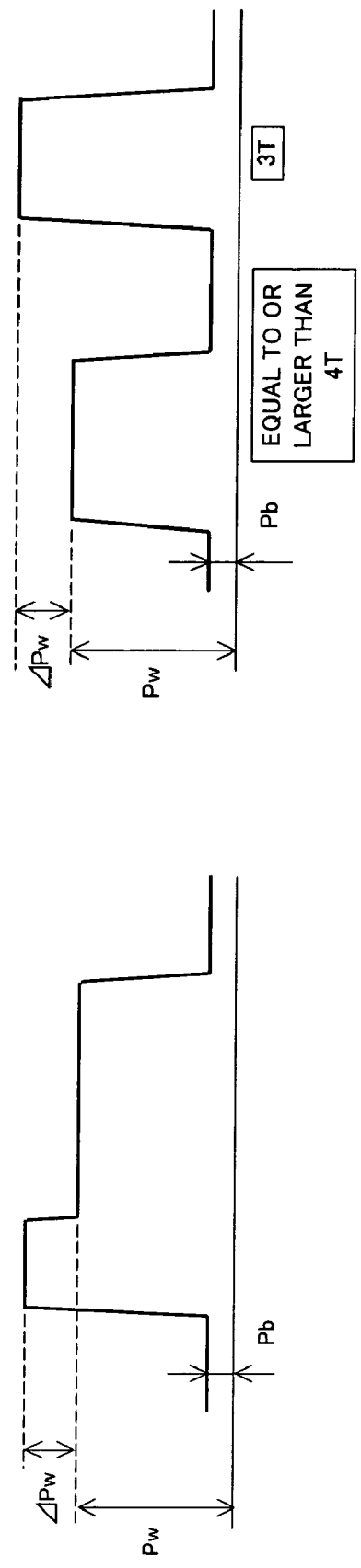
FIG. 12A
FIG. 12B

INFORMATION RECORDING APPARATUS AND INFORMATION RECORDING METHOD

TECHNICAL FIELD

The present invention relates to a method of optically recording information onto an information recording medium.

BACKGROUND TECHNIQUE

As an information recording medium capable of optically recording information, there are known a DVD-R/RW and a CD-R/RW for example, and there exists an information recording apparatus for recording the information onto the information recording medium. Such the information recording apparatus is also called "drive apparatus". At the time of information recording, the drive apparatus irradiates, onto the information recording medium, a recording light such as a laser light with an appropriate recording power, and forms pits correspondent to the recording information onto the recording surface of the information recording medium. Thereby, the drive apparatus records the information. Therefore, for precise information recording, it is necessary that the recording light of an appropriate recording power is maintained.

The drive apparatus is usually shipped after the recording power calibration in the production process. On the contrary, after the shipment, though a correction correspondent to temperature change due to circumstances is executed, the recording power calibration is not particularly performed. The correction correspondent to the temperature change is a process which corrects a current value for driving a laser diode based on the temperature of the circumstances in which the recording drive apparatus is put and a temperature characteristic of the laser diode loaded on the drive apparatus.

On the disc such as the CD-R/RW, the DVD-R/RW and a DVD+R/RW, information (hereinafter referred to as "optimum recording information"), such as an optimum recording power value and a recording power ratio for performing the precise recording onto the recording medium, is prerecorded. It is noted that the recording power ratio is a ratio of plural levels in a laser driving waveform (also referred to as "strategy") at the time of recording the information. Therefore, based on the optimum recording information recorded on the disc, the drive apparatus performs test recording for determining a preferable recording condition and actual information recording. Namely, the drive apparatus performs the recording by driving the laser diode so that the recording power meets the optimum recording power value and recording power ratio recorded on the disc.

However, even if the recording is performed on the basis of the optimum recording information recorded on the disc, the recording laser light actually outputted from the pickup is not always the optimum recording power ratio due to an error of the power calibration performed at the time of the shipment and the temperature change in the circumferences in which the drive apparatus is used. In the case, the best recording condition cannot be obtained in the test recording, and the best recording characteristic cannot be obtained in the actual information recording. This is particularly remarkable at the time of so-called high-speed recording at double, 4-times or higher speed.

DISCLOSURE OF INVENTION

The present invention has been achieved in order to solve the above problems. It is an object of this invention to make it possible to calibrate a recording power so that the recording power meets an optimum recording power ratio without receiving effects due to a power calibration error in a production process and temperature change caused by the circumstances.

According to one aspect of the present invention, there is provided an information recording apparatus including: a pickup which emits a laser light; a light receiving unit which receives the laser light emitted from the pickup; and a power calibration unit which calculates a power ratio in the laser light received by the light receiving unit and performs power calibration for calibrating a power of the laser light emitted from the pickup so that the calculated power ratio becomes identical to a predetermined reference power ratio.

According to another aspect of the present invention, there is provided an information recording method including: a process which receives a laser light emitted from a pickup; a process which calculates a power ratio in the laser light received by the light receiving unit; and a process which performs power calibration for calibrating a power of a laser light emitted from the pickup so that the calculated power ratio becomes identical to a predetermined reference power ratio.

BRIEF DESCRIPTION OF THE DRAWINGS

FIG. 11 shows an example of the laser driving waveform at the time of the 4-times speed recording of a DVD+R;

FIG. 12A shows the laser driving waveform at the time of the recording of a CD-R, and FIG. 12B shows the laser driving waveform at the time of the recording of a Multi-speed CD-R;

DETAILED DESCRIPTION OF THE PREFERRED EMBODIMENTS

Figure 1:
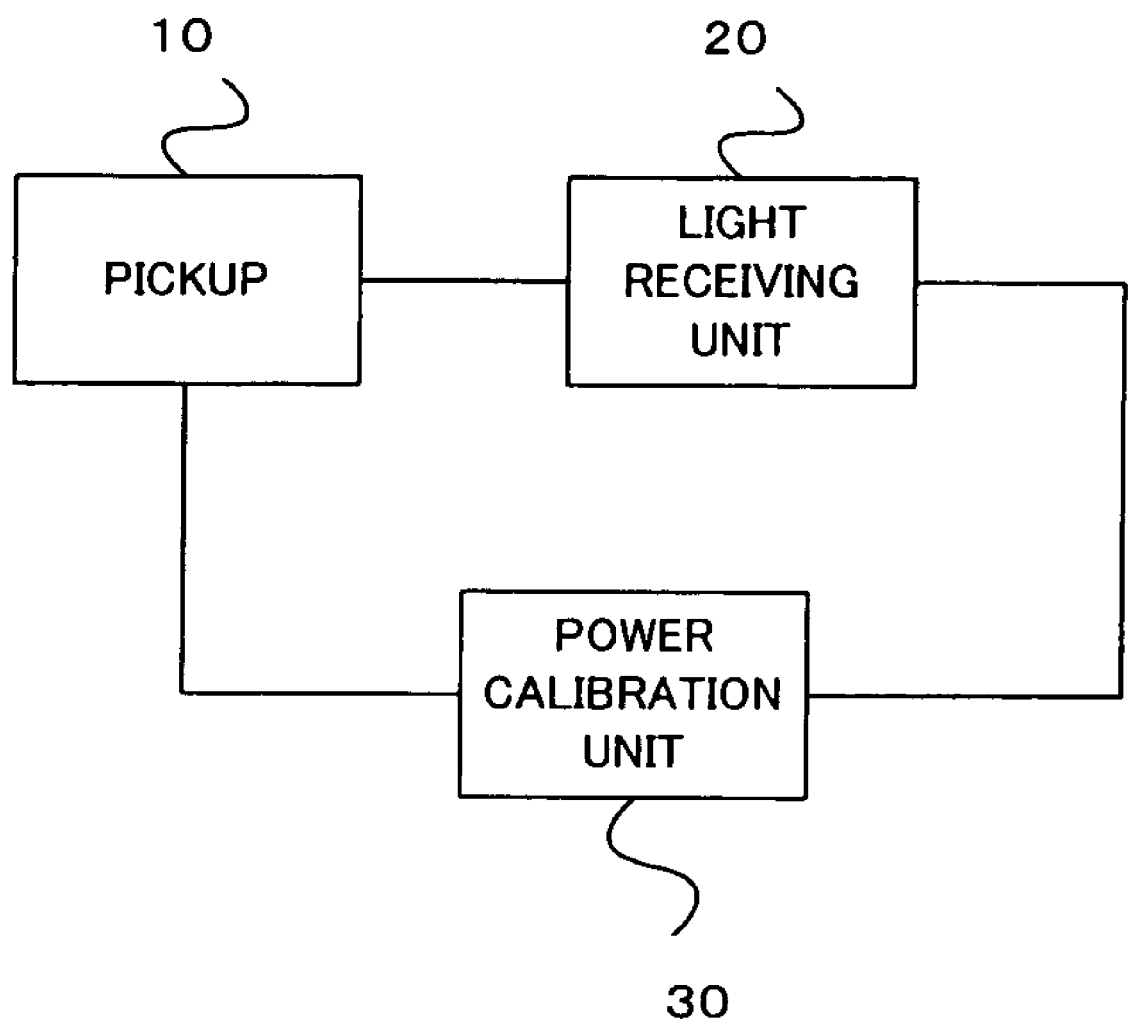
FIG. 1 is a functional block diagram showing a configuration of an information recording apparatus according to an embodiment of the present invention.

The preferred embodiments of the present invention will now be described below with reference to the attached drawings. FIG. 1 is a functional block showing a configuration of the information recording apparatus according to the embodiment of the present invention. In FIG. 1, an information recording and reproduction apparatus 1 of this embodiment includes a pickup 10 irradiating a recording light onto the information recording medium such as an optical disc, a light receiving unit 20 receiving the recording light emitted from the pickup 10 and a power calibration unit 30 detecting a power of the recording light received by the light receiving unit 20 and calibrating the power of the recording light emitted from the pickup 10 to be the optimum power ratio.

The above-mentioned information recording apparatus thus constructed irradiates, onto the information recording medium such as a DVD-R/RW, a DVD+R/RW and a CD-R/RW, the laser light from the pickup 10 to record the information. In addition, at the time of power calibration of the laser light, the laser light emitted from the pickup 10 is received by the light receiving unit 20. The level of the received laser light is detected, and based on the level, the power ratio of the laser light is determined. The power of the laser light is calibrated so that the power ratio of the laser light becomes identical to the predetermined reference power ratio. The reference power ratio indicates the power ratio capable of recording the information onto the information recording medium with the optimum recording characteristic. Thereby, it becomes possible that the information is recorded with the optimum recording characteristic.

The reference power ratio may be prerecorded onto the information recording medium. In the case, the information recording apparatus may include a reading unit which reads the reference power ratio recorded on the information recording medium by using the pickup 10. In addition, the reference power ratio may be a power ratio in a recording mode of the laser light.

The reading unit can read the optimum recording power value recorded on the information recording medium, and the power calibration unit 30 can perform the power calibration based on the optimum recording power value.

In addition, when test recording is performed before the actual information recording, the power calibration unit 30 can perform the power calibration for at least one power value within a predetermined power range determined based on the optimum recording power value.

Additionally, the power calibration unit 30 preferably performs the power calibration in a state that the pickup 10 is positioned in an area other than an information recording area of the information recording medium or in a state that the pickup 10 is positioned in a test recording area of the information recording medium. Thereby, it can be prevented that the recording is performed in error in the original information recording area of the information recording medium during the power calibration.

The above-mentioned light receiving unit 20 may be a front monitor unit in the pickup 10. In the case, by using the internal configuration of the pickup 10, the power of the laser light can be easily detected. In addition, the light receiving unit 20 may be a light detector disposed on the surface on which the information recording medium is disposed. In the case, the light receiving unit 20 can detect the same laser light power as the power irradiated onto the disc by the light receiving unit 20.

In addition, the power ratio may be a ratio of different level portions included in the laser driving waveform for the information recording. For example, the recording power ratio may be the ratio of the level of a top pulse portion to the level of an intermediate pulse portion in the laser driving waveform at the time of the information recording of the DVD-R. Similarly, as for the DVD-RW, the DVD+R, and the DVD+RW, the power ratio may be the ratio of the different level portions in the laser driving waveform at the time of the information recording.

(Embodiment)

Next, the description will be given of preferred embodiments of the present invention with reference to drawings.

[Configuration of Information Recording Apparatus]

Figure 2:
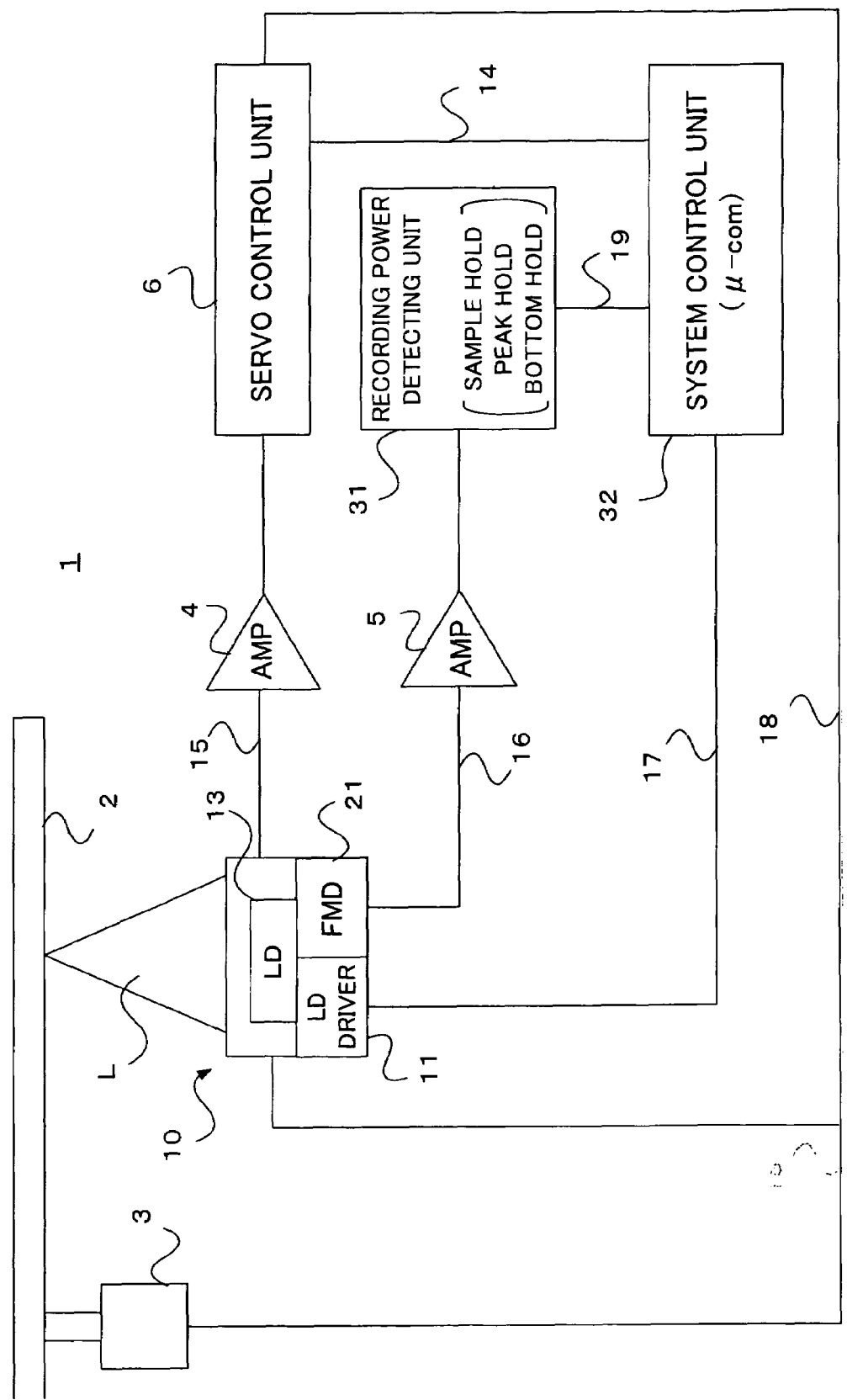
FIG. 2 shows a configuration of the information recording apparatus according to the embodiment of the present invention.

FIG. 2 shows a configuration of the information recording apparatus according to a first embodiment of the present invention. In FIG. 2, the information recording apparatus 1 records the information onto an optical disc 2 such as the CD-R/RW, the DVD-R/RW and the DVD+R/RW, and includes a spindle motor 3, the pickup 10, amplifiers 4 and 5, a servo control unit 6, a recording power detecting unit 31 and a system control unit 32.

The spindle motor 3 rotates the optical disc 2 at the predetermined speed based on the control signal supplied from the servo control unit 6. The pickup 10 includes an LD (Laser Diode) 13 serving as a light source of the recording light, an LD driver 11 driving the LD, a front monitor diode (FMD) 21 functioning as the light receiving unit and an optical system (not shown). The LD driver 11 supplies a driving current to the LD 13 based on an LD control signal 17 supplied from the system control unit 32, and makes the LD 13 emit a laser light L for recording and erasing the information via the optical system.

In addition, the pickup 10 receives the laser light reflected on the optical disc 2 by the light detector (not shown), and generates a light detecting signal 15 being the electrical signal correspondent to the light amount to output it to the amplifier 4. On the contrary, the FMD 21 receives the laser light emitted from the LD 13, and generates a laser power detecting signal 16 correspondent to the light amount to output it to the amplifier 5.

As the need arises, the amplifier 4 amplifies or attenuates the light detecting signal 15 to supply it to the servo control unit 6. Based on the light detecting signal 15, the servo control unit 6 executes various servo control, such as the tracking servo, the focus servo and the spindle servo. Concretely; the servo control unit 6 is controlled by the control signal 14 from the system control unit 32. The servo control unit detects various kinds of servo errors based on the light detecting signal 15, and generates a servo control signal 18 to supply it to the pickup 10 and the spindle motor 3, thereby to execute various kinds of servo controls.

The amplifier 5 amplifies the laser power detecting signal 16 outputted from the FMD 21 to supply it to the recording power detecting unit 31. The recording power detecting unit 31 includes a sample hold circuit, a peak hold circuit or a bottom hold circuit and the like, for example. The recording power detecting unit 31 detects the laser power at a predetermined timing from the laser power detecting signal 16 to supply it to the system control unit 32 as a detected laser power value 19.

The system control unit 32 is constructed by a micro computer and the like. Based on optimum recording information recorded on the optical disc 2 subjected to recording and the detected laser power value 19, the system control unit 32 generates the LD control signal 17 to supply it to the LD driver 11. Thereby, the power of the laser light emitted from the LD 13 is optimized.

[Power Ratio Calibration Process]

Figure 4:
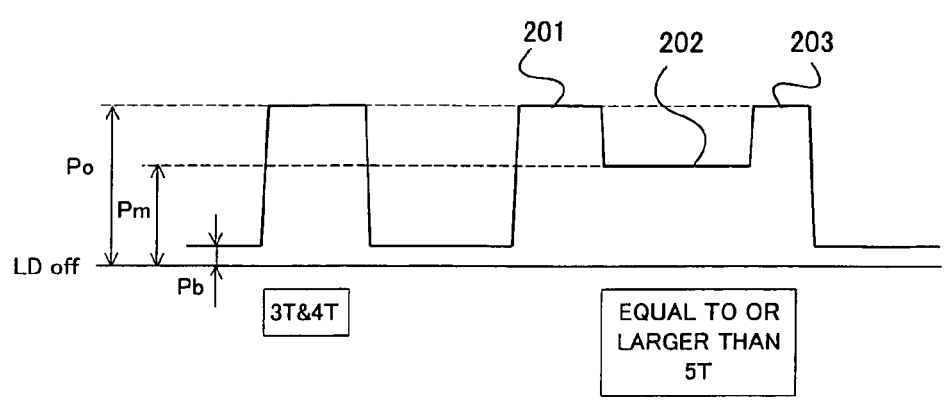
FIG. 4 shows a laser driving waveform at the time of 4-times speed recording of a DVD-R.

Next, the description will be given of the control executed in the system control unit 32 in detail. The system control unit 32 performs power ratio calibration. The optimum recording information is recorded on the optical disc 2 such as the DVD-R/RW so that the recording onto the optical disc 2 can be performed in the optimum condition. The optimum recording information is information defining the recording power necessary for performing the recording onto the optical disc 2 with the optimum recording characteristic. The detail explanation will be given later. However, in the case of the DVD-R, as shown in FIG. 4, the recording data equal to or larger than 5 T is recorded by driving the LD by the substantially recessed-shape laser driving waveform (strategy). In this case, the laser driving waveform is prescribed by a level Po of a top pulse portion 201 and a level Pm of an intermediate pulse portion 202. On the disc of the DVD-R, the optimum recording power value (in this example, the value of the level Po of the top pulse portion 201, e.g., 12 mW) and the optimum recording power ratio Pr(=Po/Pm) are recorded as the optimum recording information. Namely, information that "if the laser driving waveform is generated in order to make the level Po of the top pulse portion meet 12 mW and the recording power ratio Pr=Po/Pm and the recording is performed, the recording can be performed with the optimum recording characteristic" is recorded on the DVD-R.

Based on the optimum recording information, first, the system control unit 32 generates the laser driving waveform, and actually drives the LD 13 to emit the laser light. The emitted laser light is received by the FMD 21. The laser power is detected by the recording power detecting unit 32 to be supplied to the system control unit 32 as the detected laser power value 19. The system control unit 32 calculates the recording power ratio Pr=Po/Pm based on the detected laser power values of the top pulse portion 201 and the intermediate pulse portion 202 in the laser driving waveform shown in FIG. 4. Then, the system control unit 32 generates the LD control signal 17 and controls the LD driver 11 so that the calculated recording power ratio becomes equal to the optimum recording power ratio read from the optical disc 2. In such the method, the feedback control is executed so that the laser power actually emitted from the LD 13 becomes the optimum recording power ratio recorded on the optical disc 2. This is a power ratio calibration process according to the present invention.

Here, the DVD-R is cited as an example of the optical disc 2, and it is described that the optimum recording information includes the optimum recording power value=the level Po of the top pulse portion and the optimum recording power ratio Pr(=Po/Pm). However, the optimum recording information used in the power ratio calibration process is naturally different dependently on the kinds of discs. This will be described later.

Figure 3:
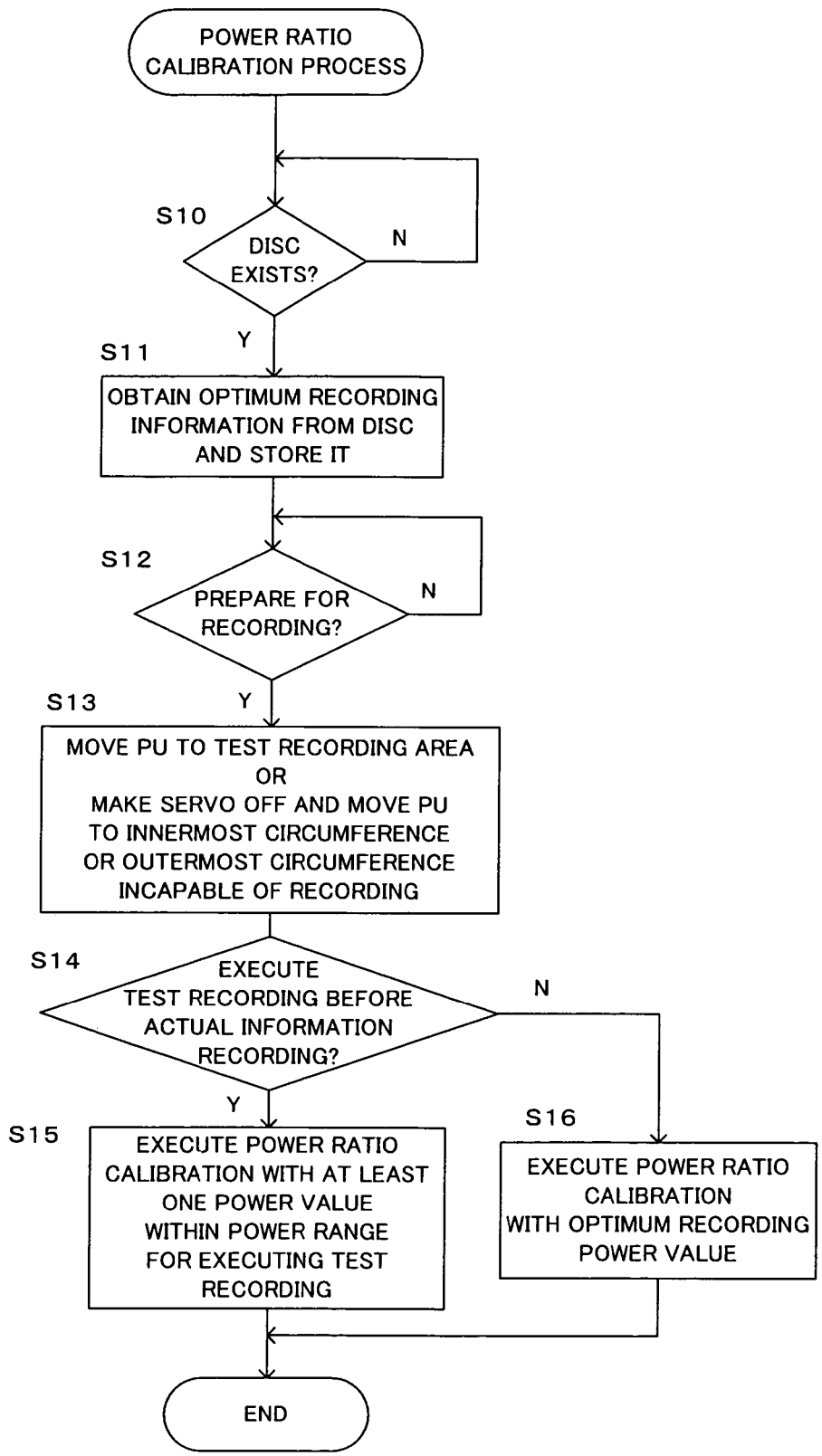
FIG. 3 is a flow chart showing an example of a power ratio calibration process.

Next, the description will be given of an example of the power ratio calibration process. FIG. 3 is a flow chart showing one example of the power ratio calibration process. This process is realized by making the system control unit 32 shown in FIG. 2 execute the program prepared in advance.

First, the system control unit 32 detects whether or not the optical disc 2 is set in the information recording apparatus 1 (step S10). When detecting the optical disc 2 being set, the system control unit 32 obtains the optimum recording information from the optical disc 2, and temporarily stores it therein (step S11). The optimum recording information includes the optimum recording power value and the optimum recording power ratio for example, as described above.

Next, the system control unit 32 determines whether or not the recording preparation is completed (step S12). This can be determined based on a state that each component of the information recording apparatus 1 including the pickup 10 can perform a recording operation and a state that a user inputs a recording instruction to the information recording apparatus 1, for example.

Next, the system control unit 32 positions the pickup 10 in the test recording (test writing) area with the servo control by the servo control unit 6 maintained, or moves the pickup 10 to the area incapable of recording, i.e., the disc innermost circumference or the disc outermost circumference, with the servo control by the servo control unit 6 turned off (step S13). Namely, the system control unit 32 positions the pickup 10 in the area other than the information recording area of the disc. It is necessary to emit the laser light from the LD 13 at the time of the calibration of the power ratio. Therefore, it has to be prevented that the useless data recording is performed in the original information recording area on the disc by the laser light. Therefore, the power calibration process is performed in the state that the pickup 10 is positioned in the test area or in the area incapable of recording at the disc inner or outer circumference.

When the pickup 10 is positioned in the area other than the information recording area of the disc, the system control unit 32 next determines whether or not to perform the test writing before the actual information recording (step S14). This can be determined by referring to the setting information indicating whether or not the information recording apparatus 1 is set to such a mode that the test recording is performed before the actual recording, for example.

When the test recording is performed (step S14; Yes), the system control unit 32 performs the above-mentioned power ratio calibration with at least one power within the power range for performing the test recording (step S15). Normally, the test recording is performed by changing the recording power within the predetermined power range, and based on the result, the optimum recording power is determined. Therefore, the system control unit 32 performs the power ratio calibration for at least one or preferably several recording power value(s) within the predetermined power range for performing the test recording. In this case, the predetermined power range for performing the test recording can be determined by setting the optimum recording power value pre-read from the optical disc 2 at the center.

On the other hand, when the test recording is not performed (step S14; No), the system control unit 32 performs the power ratio calibration at the optimum recording power value pre-read from the optical disc 2. Namely, in this case, the power ratio calibration is performed only for the one recording power value.

In such the way, the power ratio calibration is performed for at least one recording power value. By performing the power ratio calibration, the laser power actually emitted from the LD 13 of the pickup 10 satisfies the condition defined by the optimum recording information. Therefore, when the test recording is performed, it becomes possible that the test recording with high accuracy is performed by using the recording power after performing the power ratio calibration in step S15. In addition, when the test recording is not performed and the actual information recording is performed, by the recording power after performing the power ratio calibration in step S16, the recording onto the optical disc 2 can be performed with the optimum recording characteristic.

[Optimum Recording Information on Various Kinds of Discs]

Next, it will be explained, for each disc, which value is used as the optimum recording information in the above-mentioned power ratio calibration process respectively, when the present invention is applied to a reproduction apparatus of various kinds of discs.

(1) DVD-R

FIG. 4 shows the laser driving waveform at the time of the 4-times speed recording of the DVD-R. In the 4-times speed recording of the DVD-R, the recording data of 3 T and 4 T is recorded by the single laser driving waveform shown on the left side of FIG. 4, and the recording data equal to or larger than 5 T is recorded by the laser driving waveform in a substantial recess shape shown on the right side of FIG. 4. When the level of the top pulse portion 201 and the last pulse portion 203 of the laser driving waveform equal to or lager than 5 T is prescribed as Po and the level of the intermediate pulse portion 202 is prescribed as Pm, the value of the optimum recording power ratio: Pr=Po/Pm is recorded on the DVD-R as the optimum recording information. Therefore, when the present invention is applied to the DVD-R, the power ratio calibration process is executed so that the recording power ratio obtained from the laser light actually emitted from the LD 13 becomes identical to the value of the optimum recording power ratio: Pr=Po/Pm. It is noted that Pb is the bias level.

Figure 5A:
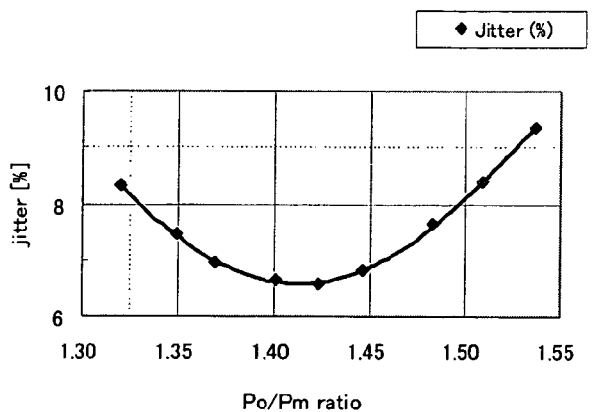
FIGS. 5A to 5C show examples of a margin characteristic of a recording power ratio Po/Pm at the time of the 4-times speed recording of the DVD-R.
Figure 5B:
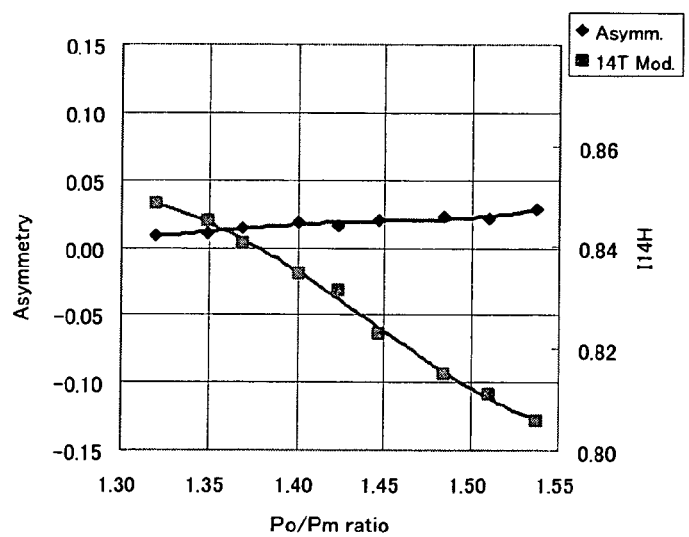
Figure 5C:
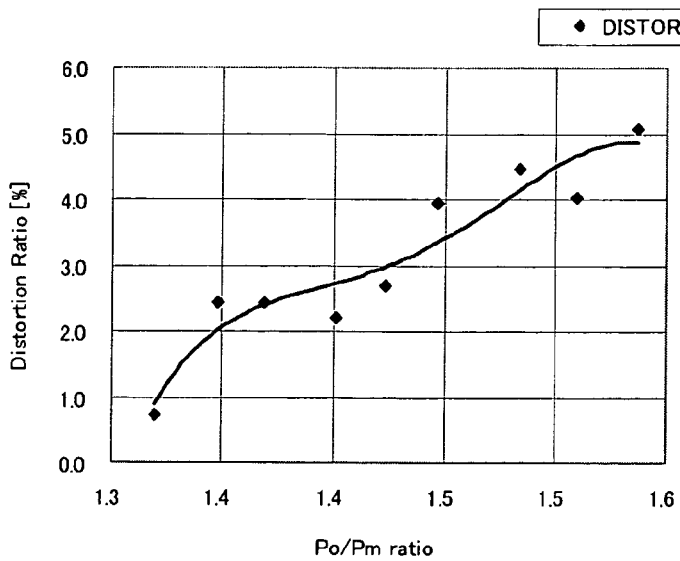

FIGS. 5A to 5C show an example of a margin characteristic of the recording power ratio: Pr=Po/Pm at the time of the 4-times speed recording of the DVD-R. In this example, the optimum recording power ratio prerecorded on the DVD-R is the value about 1.45.

First, parameters examined below will be briefly explained. "Jitter" is a value indicating a fluctuation degree of rise-up and fall-down edges of a binarized reproduction signal, with respect to a PLL clock generated from the binarized reproduction signal. As the clock jitter is higher, the quality of the reproduction signal is worse. Conversely, as the clock jitter is lower, the quality of the reproduction signal is better. According to a DVD-R standard book, the jitter value: smaller than 8.0% is necessary. "Asymmetry" is a value indicating a shift degree of the magnitude center between the minimum recording mark (3 T mark) and the maximum recording mark (14 T mark), and according to the DVD-R standard book, the asymmetry: −0.05 to 0.15 is necessary.

"Modulation (I14H)" is a value indicating a ratio ($I_{14}/I_{14H}$) of a magnitude $I_{14}$ of the reproduction signal correspondent to the maximum recording mark to a difference $I_{14H}$ between the peak value and zero level of the reproduction signal correspondent to the maximum recording mark (14 T mark) and. According to a DVD-R standard book, the modulation: equal to or larger than 0.60 (60%) is necessary.

FIG. 5A shows a relation between the recording power ratio (Po/Pm ratio) and the jitter. It is understood that as the recording power ratio is shifted with respect to the optimum value, the jitter becomes worse. FIG. 5B shows a relation among the recording power ratio, the asymmetry and the modulation. From FIG. 5B, it is understood that when the recording power ratio changes, the value of the asymmetry maintains almost constant, and when the power ratio is small, the modulation of the recording signal becomes large. This may give an adverse effect to ROPC (Running Optimum Power Control), which is not preferred. In addition, when the power ratio becomes large, the modulation becomes small, and S/N becomes worse.

Figure 6:
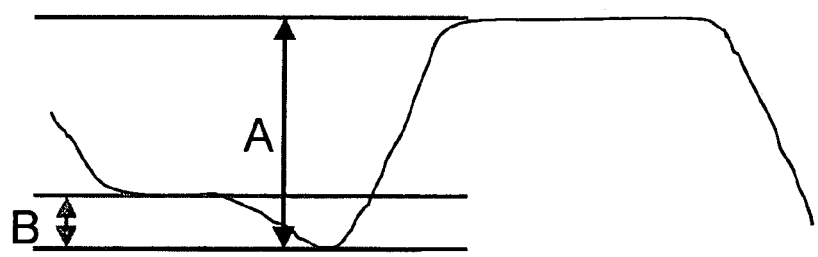
FIG. 6 is a diagram showing a definition of a distortion ratio shown in FIG. 5C.

FIG. 5C shows a relation between the recording power ratio and a distortion ratio of the recording waveform. It is understood that when the recording power ratio becomes larger than the optimum value, the distortion ratio becomes large. It is noted that the distortion ratio of the recording waveform shown in FIG. 5C is defined as shown in FIG. 6. FIG. 6 shows an example of the reproduction waveform of the recording signal, and a ratio of a distortion amount B to a magnitude A of the reproduction waveform is defined as the distortion ratio shown in FIG. 5C.

Figure 7A:
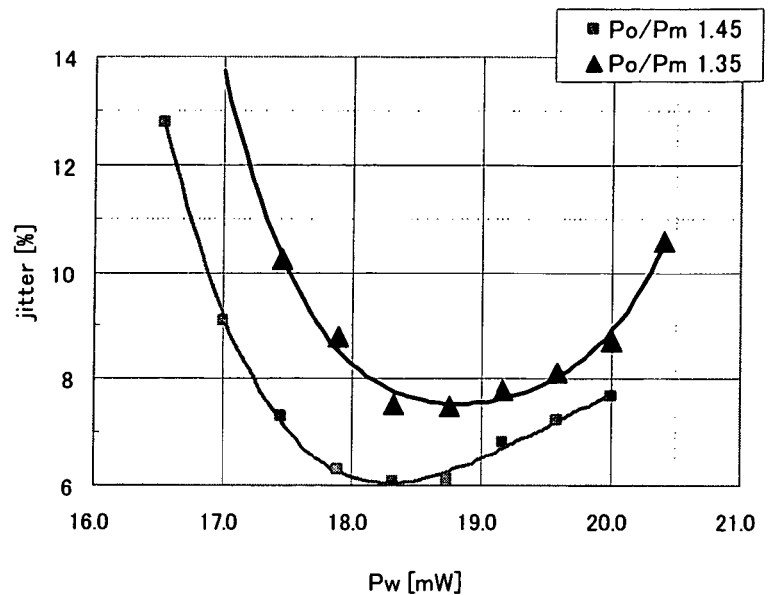
FIGS. 7A and 7B show examples of a power margin characteristic in a case that the recording power ratio is close to an optimum recording power ratio and in a case that the recording power ratio is not close to the optimum recording power ratio, at the time of the 4-times speed recording of the DVD-R.
Figure 7B:
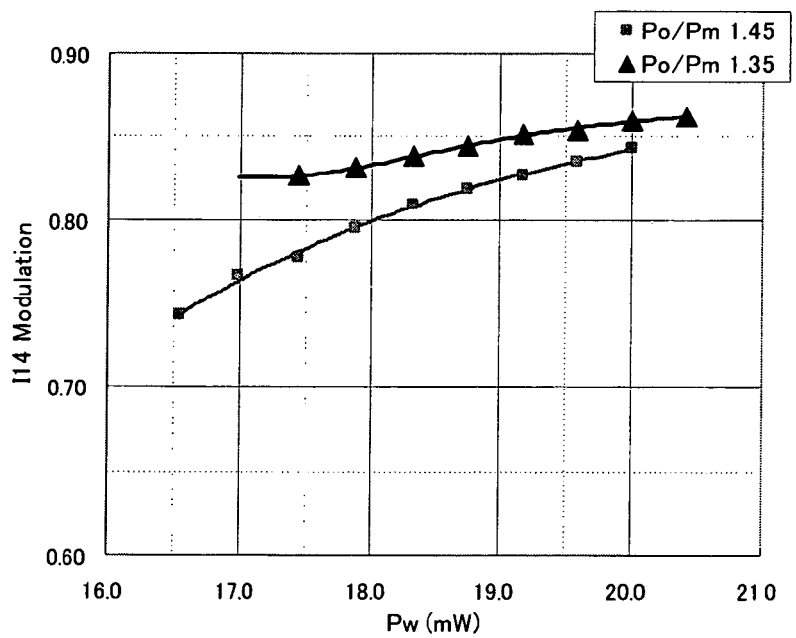

In addition, FIGS. 7A and 7B show the power margin characteristic in cases that the recording power ratio: Pr=Po/Pm is close to and not close to the optimum recording power ratio at the time of the 4-times speed recording of the DVD-R. Specifically, FIG. 7A shows the variation of the jitter in a case that the recording power Pw is varied in a condition that the recording power ratio is set to the optimum value (Po/Pm=1.45) and the other value (Po/Pm=1.35) and the recording power ratio is maintained constant. FIG. 7B shows the variation of the modulation in the case. From FIG. 7A, it is understood that when the recording power ratio is shifted with respect to the optimum value, the minimum value of the jitter increases. In addition, it is understood that the recording power Pw necessary for obtaining the minimum value of the jitter also increases. From FIG. 7B, it is understood that when the recording power ratio is small, the modulation becomes large and the variation ratio (i.e., the tilt of the graph) with respect to the power of the modulation becomes small. Thus, when the modulation during the information recording is monitored and the ROPC control is executed, the accuracy becomes worse.

As described above, when the recording power ratio is shifted with respect to the optimum recording power ratio, there appear various kinds of adverse effects as follows: the jitter increases, the modulation decreases, the distortion becomes large, the accuracy of the ROPC may decrease. Therefore, it is understood that, in order to perform the recording with the optimum recording characteristic, it is effective that the power calibration is performed so that the recording power ratio becomes identical to the optimum recording power ratio by the power ratio calibration process.

(2) DVD-RW

Figure 8:
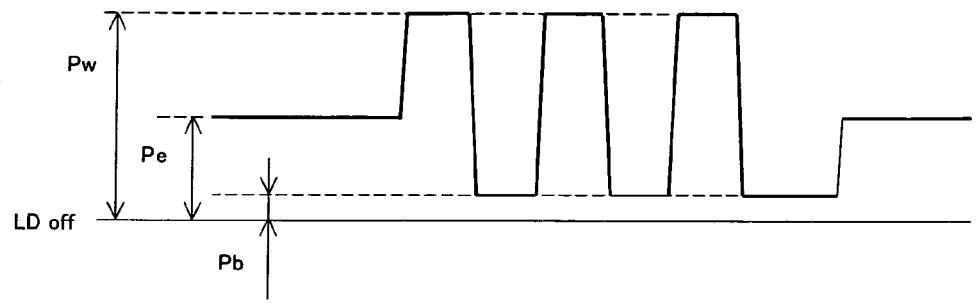
FIG. 8 shows a laser driving waveform at the time of recording on a DVD-RW.

Next, the description will be given of the optimum recording information for the DVD-RW. FIG. 8 is the laser driving waveform at the time of the recording of the DVD-RW. The laser driving waveform of the DVD-RW includes the recording power level Pw, the erasing power level Pe and the bias power level Pb. Onto the DVD-RW, the optimum value of the ratio $\epsilon$ (=Pe/Pw) of the erasing power level Pe to the recording power level Pw is recorded as the optimum recording power ratio. Thus, in the case of the DVD-RW, the above-mentioned power ratio calibration process is performed for the recording power ratio $\epsilon$.

It is noted that the laser driving signal of the similar waveform is used for the information recording, as for the CD-R and the DVD+RW. Therefore, the power ratio calibration process may be executed for the recording power ratio $\epsilon$, similarly to the DVD-RW.

Figure 9A:
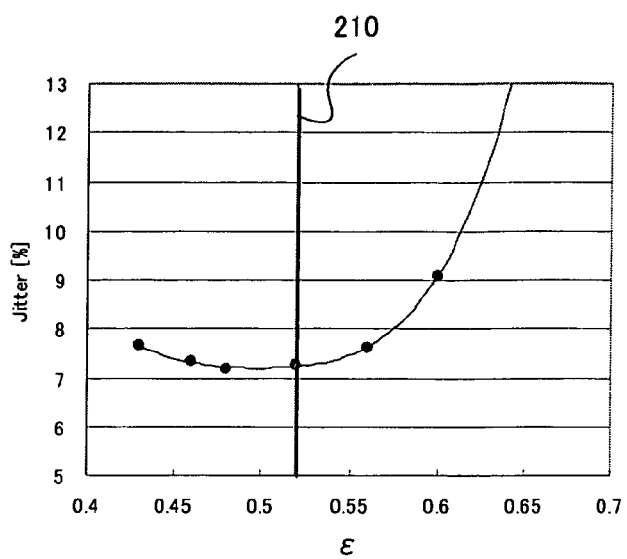
FIGS. 9A to 9C show examples of a margin characteristic of a recording power ratio at the time of double speed recording of the DVD-RW.
Figure 9B:
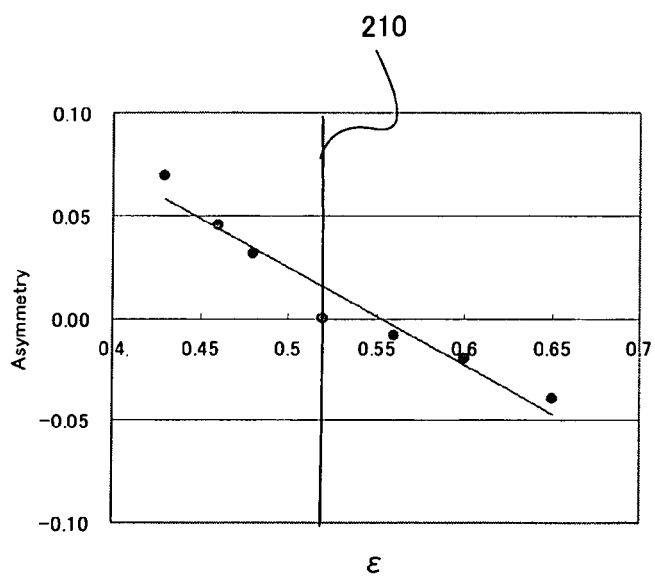
Figure 9C:
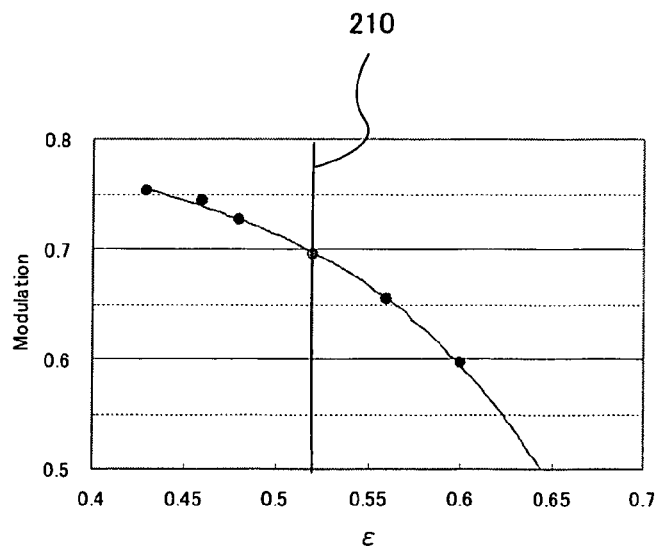

FIGS. 9A to 9C are examples of the margin characteristic of the recording power ratio $\epsilon$ at the time of double speed recording of the DVD-RW. FIG. 9A shows a relation between the recording power ratio $\epsilon$ and the jitter, FIG. 9B shows a relation between the recording power ratio $\epsilon$ and the asymmetry, and FIG. 9C shows a relation between the recording power ratio $\epsilon$ and the modulation. It is noted that the optimum recording power ratio is $\epsilon$=about 0.52 (indicated by a straight line 210 in FIGS. 9A to 9C) in this example. From FIG. 9A, it is understood that when the recording power ratio $\epsilon$ is shifted with respect to the optimum recording power ratio, the jitter becomes worse. From FIG. 9B, it is understood that when the recording power ratio $\epsilon$ is shifted with respect to the optimum recording power ratio, the asymmetry varies. Additionally, from FIG. 9C, it is understood that when the recording power ratio $\epsilon$ is shifted with respect to the optimum recording power ratio, the modulation varies.

As described above, when the recording power ratio $\epsilon$ is smaller than the optimum recording power ratio, the increasing amount of the jitter is small. But the asymmetry becomes deep, and the modulation is saturated. Namely, the recording power becomes too large, which gives the adhesive effect to the repetitive recording characteristic of the DVD-RW. That is, a number capable of rewriting decreases. On the contrary, when the recording power ratio $\epsilon$ is larger than the optimum recording power ratio, the asymmetry becomes shallow, and the jitter becomes worse.

Figure 10:
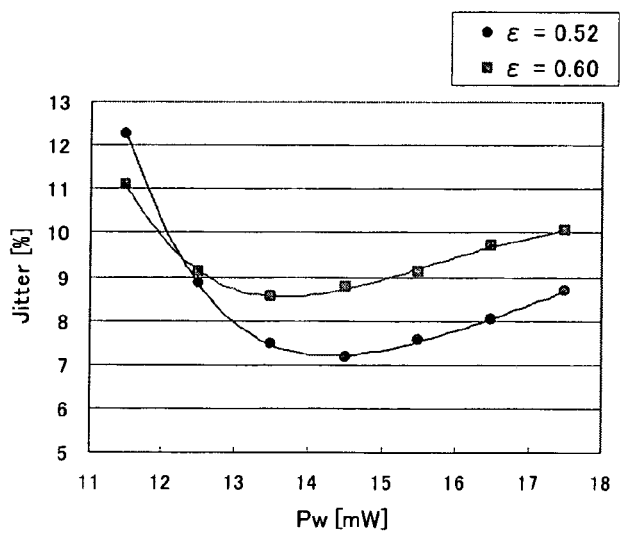
FIG. 10 shows an example of the power margin characteristic in a case that the recording power ratio is identical to the optimum recording power ratio and in a case that the recording power ratio is not identical to the optimum recording power ratio at the time of the double speed recording of the DVD-RW.

FIG. 10 shows examples of the power margin characteristic in a case that the recording power ratio $\epsilon$ ($\epsilon$=0.52) is identical to the optimum recording power ratio and in a case that the recording power ratio $\epsilon$ is not identical to the optimum recording power ratio ($\epsilon$=0.60) at the time of the double speed recording of the DVD-RW. In FIG. 10, the horizontal axis shows the recording power value Pw, and the vertical axis shows the jitter. As understood with reference to FIG. 10, in-the case that the recording power ratio $\epsilon$ is not identical to the optimum recording power ratio, the minimum jitter value becomes large in comparison with the case that the recording power ratio $\epsilon$ is identical to the optimum recording power ratio.

Like this, in the DVD-RW, it is understood that by making the recording power ratio $\epsilon$ identical to the optimum recording power ratio (about 0.52 in this embodiment), the optimum recording characteristic can be obtained.

(3) DVD+R

FIG. 11 shows an example of the laser driving waveform at the time of the 4-times speed recording of the DVD+R. The recording power for forming the recording mark equal to or lager than 5 T is Pp, the recording power for forming the recording mark of 4 T is Pp+$\Delta$Pp (4 T), and the recording power for forming the recording mark of 3 T is Pp+$\Delta$Pp (3 T). On the DVD+R, the recording power Pp shown in FIG. 11 and the ratio of the recording power at the time of recording 3 T mark and 4 T mark to the recording power Pp. Namely, the recording power ratio: $\Delta$Pp(3 T)/Pp and $\Delta$Pp(4 T)/Pp are recorded as the optimum recording information. Therefore, in the case of the DVD+R, the above-mentioned power ratio calibration process is executed for the recording power ratios.

(4) CD-R

FIG. 12A is the laser driving waveform at the time of the recording of the CD-R, and FIG. 12B is the laser driving waveform at the time of the recording of a Multi-speed CD-R. On the CD-R, the ratio of the recording power $\Delta$Pw to the recording power Pw in FIGS. 12A and 12B is recorded as the optimum recording information. Thus, in the case of the CD-R, the above-mentioned power ratio calibration process is executed for the recording power ratio ($\Delta$Pw/Pw)

[Modification 1]

Next, the description will be given of a modification of the above-mentioned information recording apparatus. The modification applies the above-mentioned power ratio calibration process to the determination of the erasing power. As for the disc on which the information is repeatedly recorded, such as the DVD-RW, the DVD+RW and the CD-RW, at the time of rewriting the information similarly to the time of the recording, by performing the test recording after performing the power ratio calibration, the recording power and the erasing power can be determined. By erasing the recording information with the erasing power thus determined, the appropriate erasing can be performed.

Figure 13:
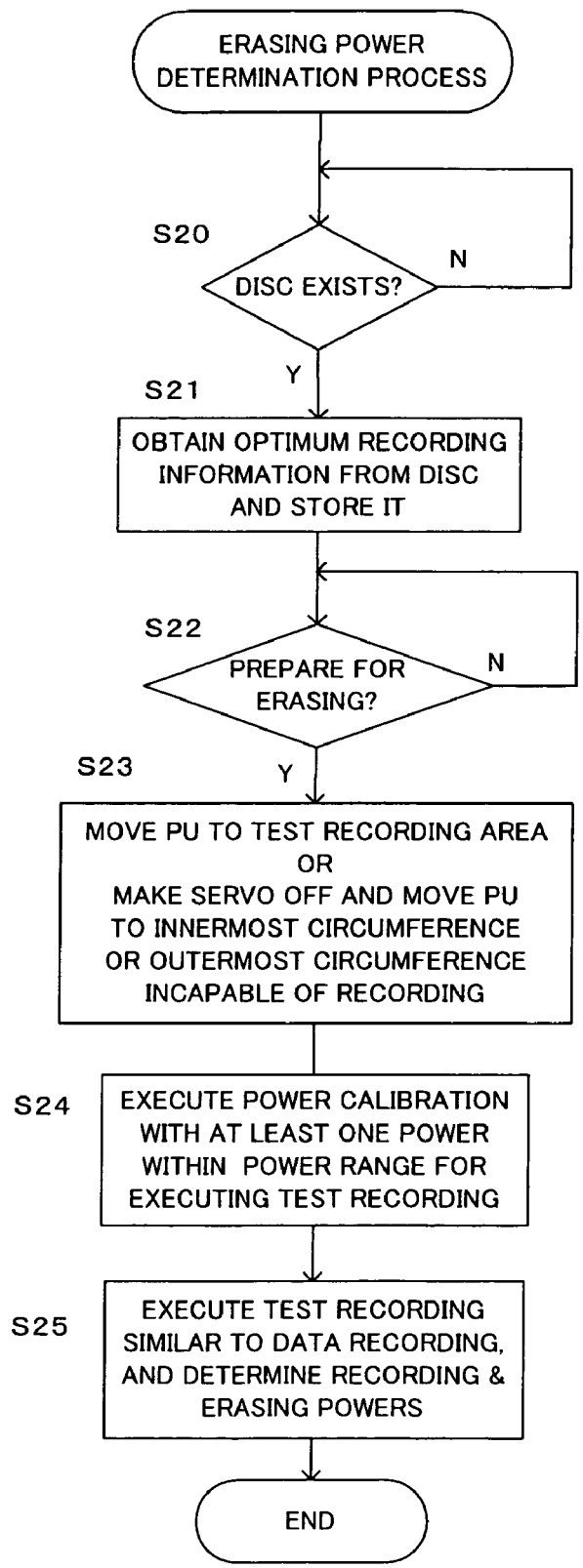
FIG. 13 shows a flow chart of an erasing power determination process according to a modification.

FIG. 13 shows a flowchart of the erasing power determination process according to this modification. This process is realized by making the system control unit 32 shown in FIG. 2 execute the program prepared in advance.

First, the system control unit 32 detects whether or not the optical disc 2 is set in the information recording apparatus 1 (step S20). When detecting the optical disc 2 being set, the system control unit 32 obtains the optimum recording information from the optical disc 2 to temporarily store it therein (step S21). The optimum recording information includes the optimum recording power value and the optimum recording power ratio, as described above.

Next, the system control unit 32 determines whether or not erasing the information is prepared (step S22). Next, the system control unit 32 maintains the servo control by the servo control unit 6 and positions the pickup 10 in the test recording area, or makes the servo control by the servo control unit 6 turned off and moves the pickup 10 to the area incapable of recording at the disc innermost circumference or to the disc outermost circumference (step S23). Similarly to the case of the power calibration process shown in FIG. 2, by positioning the pickup 10 in the area other than the information recording area of the disc, it can be prevented that the useless data recording is performed in the original information recording area on the disc by the laser light during the erasing power determination process.

Next, the system control unit 32 performs the above-mentioned power ratio calibration with at least one power within the power range for the test recording (step S24). Thus, the power ratio calibration is performed for at least one power value. By performing the power ratio calibration, the laser power actually emitted from the LD of the pickup 10 satisfies the condition defined by the optimum recording information.

Next, the system control unit 32 performs the test recording with the recording power after performing the power ratio calibration, and determines the recording power and the erasing power (step S25). Thereby, it becomes possible that the information is erased with the appropriate power.

[Modification 2]

Figure 14:
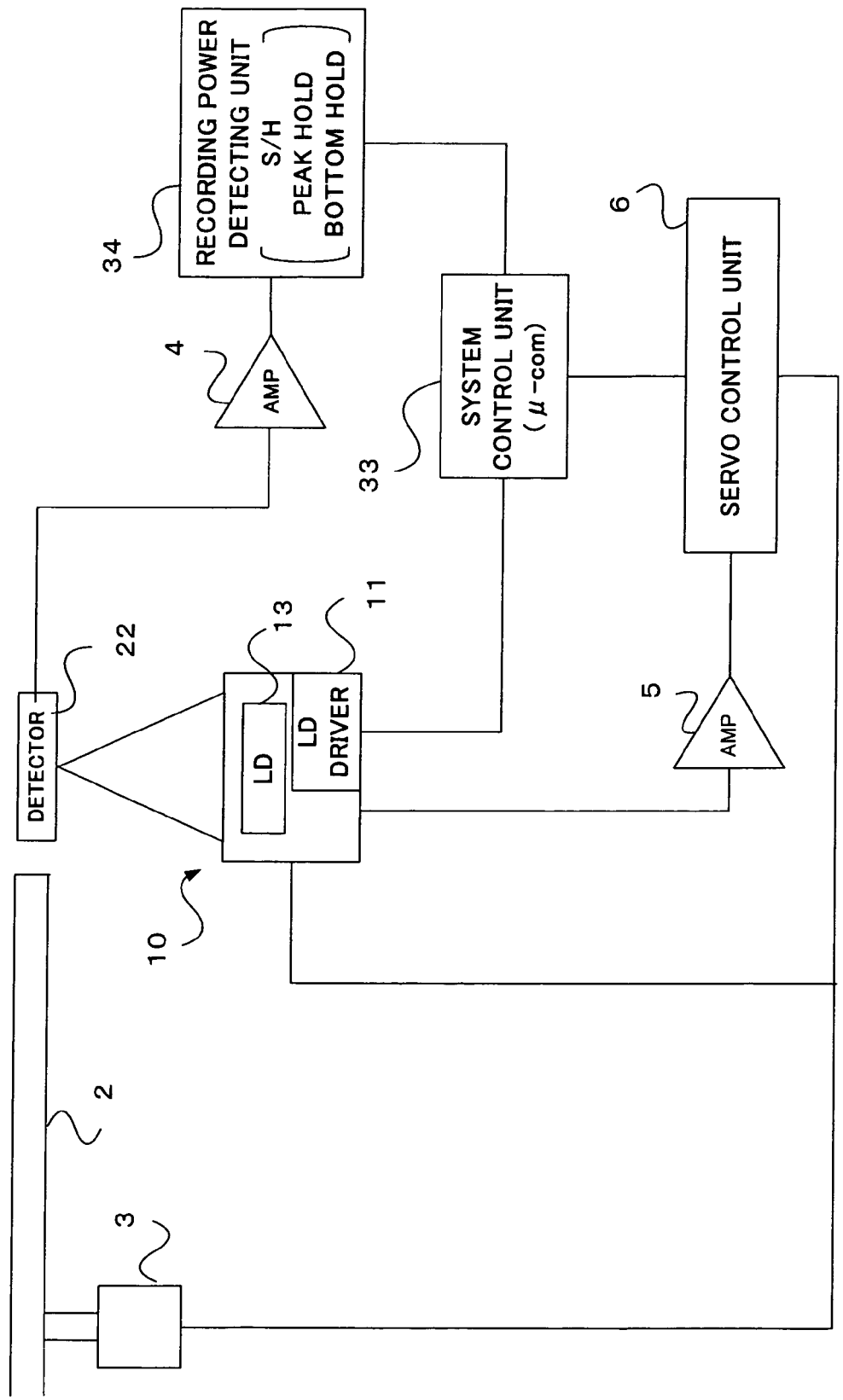
FIG. 14 is a configuration block diagram of a modification of the information recording apparatus.

Next, another modification will be explained. This modification is a modification of the light receiving unit 20 receiving the laser light emitted from the LD, and FIG. 14 shows a configuration thereof. In FIG. 14, the same reference numerals are given to the same components as those of the information recording apparatus 1 shown in FIG. 2.

In the above-mentioned embodiment, the FMD is used as the detecting unit of the recording power. However, as shown in FIG. 14, a detector 22 may be provided at a position on the outer circumferential side of the optical disc 2 so that the detector 22 does not contact the optical disc 2, and may be used as the light receiving unit 20, for example. Like this, when the detector 22 is provided at the position on the outer circumferential side of the optical disc 2 on the same surface as the optical disc 2 and the output laser light of the LD 13 is detected, unlike the FMD, the power of the laser light actually irradiated onto the optical disc 2 can be detected by the detector 22.

As explained above, in the present invention, the information recording apparatus includes the pickup emitting the laser light, the light receiving unit receiving the laser light emitted from the pickup such as the FMD or the detector, the recording power detecting unit and the system control unit determining the power ratio in the laser light received by the FMD or the detector and calibrating the power of the laser power emitted from the pickup in order to make the determined power ratio identical to the predetermined reference power ratio. Therefore, by the power ratio calibration, in all the drive apparatus, it becomes possible to perform the actual information recording and test recording with the appropriate power ratio in any temperature circumstance. Moreover, it becomes possible to prevent an error of the power calibration at the time of the shipment from a factory and the change of the power ratio caused due to variation of differentiating quantization efficiency of the LD by the temperature change. As a result, the optimum recording characteristic can be obtained. This is particularly effective at the time of the recording with the increased speed at which the accuracy is necessary. In addition, since not power absolute value calibration but the power ratio calibration is performed, a special system and a complicated technique are unnecessary.

INDUSTRIAL APPLICABILITY

This invitation is applicable to an apparatus for recording and reproducing the information onto and from various kinds of optical discs such as the DVD-R/RW, the CD-R/RW, the DVD+R/RW.

The invention claimed is:
1. An information recording apparatus comprising:
a pickup which emits a laser light;
a light receiving unit which receives the laser light emitted from the pickup; and
a power calibration unit which calculates a recording power ratio which is a ratio of light receiving levels detected by the light receiving unit correspondent to different emitting level portions of the laser light and performs power calibration for calibrating a recording power of the laser light emitted from the pickup so that the calculated recording power ratio becomes identical to an optimum recording power ratio.

2. The information recording apparatus according to claim 1,
wherein a driving waveform of the laser light includes a top pulse and a last pulse having a first level respectively and an intermediate pulse portion positioned between the top pulse and the last pulse and having a second level smaller than the first level, and
wherein the recording power ratio is a ratio of a light receiving level of the light receiving unit correspondent to the top pulse or the last pulse to a light receiving level of the light receiving unit correspondent to the intermediate pulse portion.

3. The information recording apparatus according to claim 1,
wherein a driving waveform of the laser light includes a recording power level, an erasing power level and a bias power level, and
wherein the recording power ratio is a ratio of the light receiving level correspondent to the laser light in the erasing power level to the light receiving level correspondent to the laser light in the recording power level.

4. The information recording apparatus according to claim 1, further comprising a reading unit which reads the optimum recording power ratio recorded on an information recording medium by using the pickup.

5. The information recording apparatus according to claim 1, wherein the power calibration unit performs the recording power calibration for at least one power value within a predetermined power range determined based on the optimum recording power value when test recording is performed before actual information recording.

6. The information recording apparatus according to claim 1, wherein the power calibration unit performs the power calibration in a state that the pickup is positioned at an area other than an information recording area of the information recording medium.

7. The information recording apparatus according to claim 1, wherein the power calibration unit performs the power calibration in a state that the pickup is positioned in a test recording area of the information recording medium.

8. The information recording apparatus according to claim 1, wherein the light receiving unit is a front monitor unit in the pickup.

9. The information recording apparatus according to claim 1, wherein the light receiving unit is a light detector disposed on a surface on which the information recording medium is disposed.

10. An information recording method comprising:
a process which receives a laser light emitted from a pickup;
a process which calculates a recording power ratio which is a ratio of light receiving levels detected by the light receiving process correspondent to different emission level portions of the laser light; and
a process which performs a power calibration for calibrating a recording power of a laser light emitted from the pickup so that the calculated recording power ratio becomes identical to an optimum recording power ratio.

* * * * *